TAPE CRIMPER

Filed July 1, 1959

2 Sheets-Sheet 1

INVENTOR.
O. W. SWENSON
BY Robert H. Henderson
ATTORNEY

May 25, 1965 O. W. SWENSON 3,185,764

TAPE CRIMPER

Filed July 1, 1959 2 Sheets-Sheet 2

United States Patent Office 3,185,764
Patented May 25, 1965

3,185,764
TAPE CRIMPER

Oscar W. Swenson, Cedar Grove, N.J., assignor to The Western Union Telegraph Company, New York, N.Y., a corporation of New York Filed July 1, 1959, Ser. No. 824,394
8 Claims. (Cl. 178—17)

This invention relates to means for storage of perforated telegraph tape and more particularly to novel means for overcoming tape snarls occurring when paper tape is pushed into a storage container which is remotely located.

In handling telegraph message traffic in a central office it is common to receive the messages of each incoming line on a separate tape printer-perforator connected to that incoming line, and then to retransmit it at very high speed by means of a "loop gate transmitter" on a "cross-office" circuit, to a "reperforating" machine associated with the "loop gate transmitter" of a desired outgoing line. This is done whenever the opportunity presents, i.e., whenever the reperforator is not receiving a message from some one of a number of other receiving perforators which may at various times be connected to it. By this means the second perforating machine is always available for the receipt and holding for retransmission of received messages over a given outgoing line either immediately or after a very short wait, whenever such messages may arrive, despite the fact that the slower rate of the outgoing transmitter to which the punched tape is supplied may not be able to keep pace with the accumulated traffic at all times.

When such a condition occurs, an excess of punched tape accumulates between the adjacently located reperforator and the outgoing transmitter, and it is common to divert this excess downwardly into a storage bin. A similar situation exists between the incoming printer-perforator and the cross-office transmitter, and a similar storage bin is there provided. It is the practice to locate such bins near the floor level, and when the machines are located at waist level or above, a narrow chute for the tape leads downwardly into the bin. Tangling and tape pile-up can occur, especially in this chute, since the tape must be simultaneously pushed down and pulled out of the same chute, receiving but little assistance from gravity because of its light weight, and being both very flexible and burdened with a relatively rough surface. This roughness of the tape surface arises from the punching of the information holes and the perforation of feed holes in the tape. The method widely used for accomplishing these functions does not result in a clean round hole in the tape, but leaves the punched-out portion fastened at one side to the edge of the tape hole in the form of a lid which is lifted slightly from the surface of the tape, so that the surface is covered with a series of projections resembling hooks. These are oppositely directed on the entering and leaving tape, so that when any substantial bending of the tape occurs to raise the opposed lids appreciably, interference or even interlocking of opposed lids can occur, resulting in a tape tangle. It is from the jagged edges of the feed holes, however, which are perforated with a sharp pointed instrument, rather than being punched cleanly, that the greatest tendency to interlock and entangle arises. Moreover, static charges of electricity can accumulate on the tape during conditions of low humidity which cause it to be diverted from its proper path, and to cling to surrounding surfaces so that the tendency of the tape to bend is aggravated. Under high humidity conditions, on the other hand, the tape often becomes so limp as to have practically no rigidity or ability to be pushed.

It is to overcome these difficulties which have long existed in the art that the U.S. application of Frank J. Haupt and William J. Ramhorst, entitled "Means to Facilitate the Handling of Telegraph Storage Tape," and bearing the Serial No. 334,864, was filed on February 3, 1953, now Patent No. 2,818,468, granted December 31, 1957. That application disclosed that tape could be rendered stiff enough to push successfully, and to overcome tangling difficulties, by creasing the tape longitudinally, preferably by means of a pressure plate and a sliding shoe operating to iron a crease into the tape during its passage therebetween.

It has been found that certain difficulties experienced with the operation of that device and brought about by the necessity of pushing the tape through a frictionally resistive sliding deforming means, could not be avoided so long as that principle of operation was adhered to. Those difficulties comprise the effects of excessive tape friction incurred in the operation of the device, in spite of elaborate steps taken to reduce such friction, and a consequent limitation on the severity of tape crimping deformation possible by the use of such principle. It has also been found that the operation of desirable auxiliary sensing devices which impose further friction in the path of the tape, such as the tape tie-up alarm and the out-of-tape alarm, as later more fully described, is prejudiced by the decreased ability of the paper tape to resist buckling when the above described passive system of tape deformation by extrusion is employed.

Since devices of this type are especially useful in cases where the equipment is operated unattended, or with a minimum of attention by the operators, it has been found necessary to provide alarm functions in the equipment in order that inevitable occasional malfunction of the associated units will not cause indefinite outages of equipment and a multiplication of failures in dependent equipment. It has been found further that such alarm functions are most effective when incorporated as a part of the instant tape crimping machine, rather than the more obvious and customary location close to the source of trouble in the associated units respectively, because the delayed effect of a torn tape condition, for example, first becomes of critical importance in the crimping device, and any false alarms which might be reported in preceding equipment may safely be ignored until presence of the tape end is detected in the crimper, at which point the crimper motor must be stopped immediately in order to prevent the end of the tape from being fed into and lost in the storage bin. The provision of such an alarm has not been a necessary requirement in previous types of tape crimping mechanism, but because of the new mode of operation of the instant device such an alarm is essential for its proper functioning for the reason last mentioned, as well as being desirable in any case for the reason first mentioned.

It is also fund by placing a tie-up indicator (later to be described) in association with the instant device, that the constant running gear motor therein, in contrast to the step magnets of the associated equipment, provides a mode of operation sufficiently uniform to enable a simple and highly effective method of commutator modulation to be employed in a type of tape tie-up alarm circuit which would otherwise be impractical for use.

It is therefore an object of the present invention to provide means for imposing an adequate rigidifying longitudinal crimp to telegraph tape, which is unlimited in its effectiveness by the extrusion capabilities of the tape.

It is another object of the invention to provide a tape crimper wherein loss of a broken tape end in the storage bin is avoided.

Still another object is to provide such a tape crimper capable of supplying a tape tie-up alarm signal adapted to simple detection equipment.

A further object is to provide a crimper capable of operation at speeds of 200 words per minute with minimum motive power requirements.

A still further object is to provide a tape crimper usable with practically any type of tape or type of storage system.

A clearer understanding of the operation and advantages of the present invention may be obtained from the following detailed description of a preferred embodiment of the invention, taken in connection with the drawings, wherein.

Figure 1:
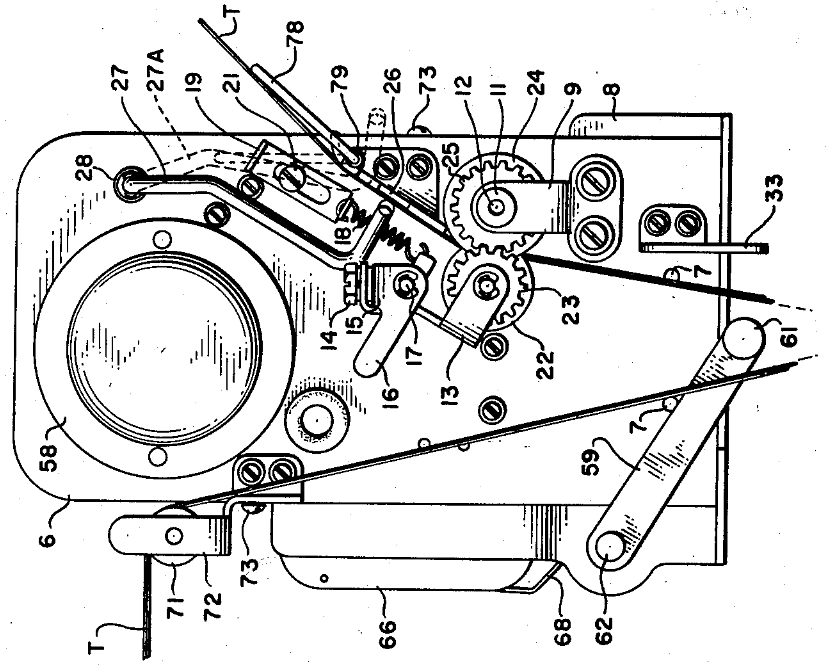
FIG. 1 is a front view of a tape crimper constructed in accordance with the instant invention.

Turning now to the drawings, there is seen in FIG. 1 a rigid backing plate of metal 6 secured by screws 7 to an angular mounting plate 8. A bracket 9 is screwed to plate 6 and carries an outboard bearing 11 in which rotates the shaft 12 journalled also in backing plate 6. A yoke 13 is fastened by bolt 14 to a second yoke 15 which is provided with a handle 16 and is pivoted on stud 17 screwed into backing plate 6. A spring 18 is hooked through a hole in a tail on yoke 15 to urge yoke 13 in the direction of shaft 12 with a force dependent upon the adjustment of slotted bracket 19 to which the fixed end of spring 18 is secured, and which is adjustably retained in contact with backing plate 6 by means of a screw 21 therein.

A shrouded roller 22 provided with an attached gear 23 is journalled in the yoke 13, and is urged by force of the spring 18 into frictional contact as well as geartooth engagement with a complementary shrouded roller 24 and gear 25 on the shaft 12.

These rollers provide the tractive effort for pulling the telegraph tape T through the device and simultaneously comprise a pair of roller dies for imparting a longitudinal crease in each side of the tape. As seen more clearly in FIG. 2, the shrouds of roller 22 are not radial, but are conical on their inner surfaces, and engage mating recesses in roller 24 which nevertheless have radial sides. The shrouds on roller 24 act as a tape guide to keep the tape centered on the rollers. The crimp imparted to the tape by this means amounts to a deformation of only about 15 degrees after springback, which does not impair its essentially flat surface, so that it retains an unrestricted ability to form compact loops in the storage bin, but at the same time is a sufficient folding to ensure that when the tape is straight, either before or after storage, an adequate measure of rigidity is imparted to it by the permanent slight creases to prevent any likelihood of tangling.

Figure 2:
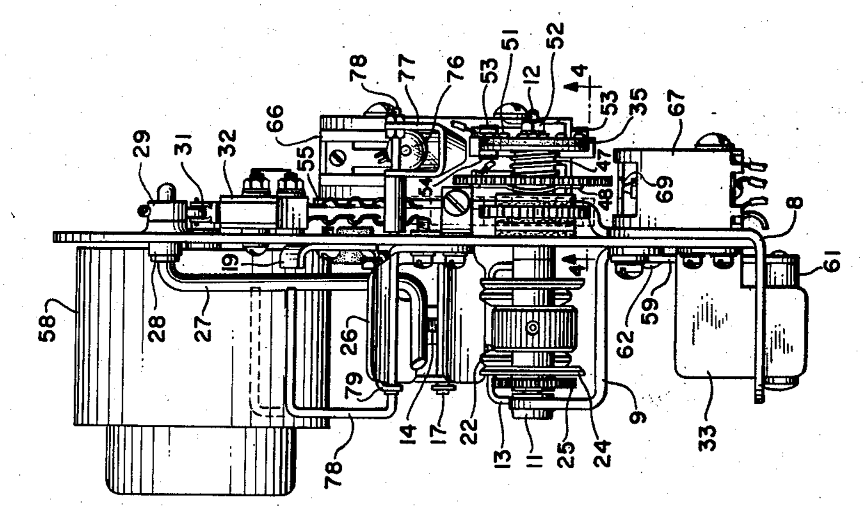
FIG. 2 is a side view of FIG. 1.

It has been found by the use of a straight knurled surface on both of the rollers 22 and 24, which can be seen in FIG. 2, and by the use of the gears 23 and 25 to cause both of these rollers to develop traction on the tape, that the motive power requirement of the rollers is substantially reduced. Besides the obvious saving in cost involved in satisfying the decreased motive power requirement resulting from this construction, it is found that by the use of such smaller motor an unexpectedly great reduction of the rotational inertia of the motor armature results so that the speed with which the motor can pick up the load is greatly increased and the coasting of the rollers after power is removed from the motor is reduced to a value which is tolerable, consistent with the use of an automatic switching mechanism whereby the motor is controlled, as later described.

It is further found that by the use of such gears, the operating pressure between the rollers can be reduced from over a pound to less than eight ounces. Since the motor may operate for considerable periods of time without moving a tight tape, a substantial reduction of wear and likelihood of damaging the clutch is thus attained.

Inasmuch as the roller 22 is spring-urged into tractive position on a paper tape which may be of variable thickness, it is evident that the center distance of the gears 23 and 25 is variable within a limited range. In order to preserve a desirably constant and equal angular velocity of the gears, therefore, it is necessary that the teeth of the said gears have an involute shape, and it is further found that in view of the relatively light loading imposed upon them, they may be constructed advantageously of a plastic compound having a low coefficient of friction such as an adipic or fluorethane ("nylon" or "Teflon") polymer, in which case all need for lubrication of the gears is obviated. Fastened to backing plate 6 is a tape guide 26 over which the tape slides in entering the rollers. A tape arm 27 of formed wire is journalled in a bushing 28 in the backing plate 6 and is normally supported in place by pressing lightly against the tape. When tape is absent from the tape guide 26, however, tape arm 27 falls through a slot in the said guide and into the position 27A, as seen also in FIG. 2, and in so doing, rotates the attached cam 29 thereby depressing rollers 31 of roller actuated switch 32 for the purpose of deenergizing the rollers 22 and 24 so that upon arrival of a torn or broken tape it will not be fed through the rollers and drop downward into the tape storage bin (not shown) beneath the unit.

A locating vane 33 is screwed to the backing plate 6 and is for the purpose of engagement with a slot in the horizontal mounting surface onto which mounting plate 8 is bolted, so that elongated mounting holes of broad dimensional tolerance may be employed without sacrifice of precision in the location of the mounting position.

Figure 4:
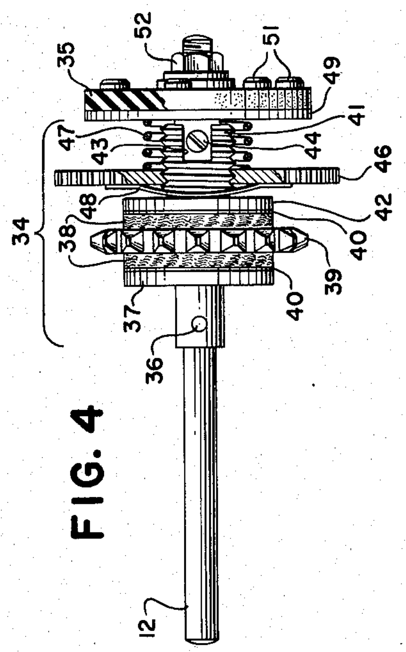
FIG. 4 is a view of a section of FIG. 2 taken on the line 4—4 of FIG. 2.

Complementary driving roller 24 is secured to the shaft 12 which extends through backing plate 6, seen in FIG. 2, to retain the friction clutch assembly 34 and interrupter disc 35 as shown enlarged in FIG. 4.

Because of the intermittent nature of the operation of telegraph tape perforation machinery it is desirable that any following device which employs a motor driven feed mechanism, such as the instant invention, provide a constant small tension on the tape, rather than attempt to switch on and off in an effort to follow the erratic tape supply, because of the unavoidable inertial overrun of the motorized feed mechanism. It is therefore necessary to supply a driving force which is accurately limited as to its maximum value and which is (preferably) conveniently adjustable as to the maximum value in order to provide a tape tension which is exactly proportioned to the needs of the particular installation and the tensile strength of the particular type of paper tape which is in use at the time.

This is accomplished in the present invention by means of the adjustable tension friction clutch assembly 34 of FIG. 4. Shaft 12 has affixed thereto by the pin 36 a flanged collar 37, and the oil saturated washers of wool felt 38 together with a driving sprocket 39 retained by, but freely rotatable on the shaft 12. A sleeve 41, exteriorly threaded and provided with a flange 42, is slidable on the shaft 12 in a longitudinal direction only by reason of a slot 43 cut into it which slidably engages a screw 44 protruding from a tapped hole in the shaft 12. A knurled disc 46 has a threaded central hole engaging the thread of sleeve 41, and is a convenient diameter substantially larger than the other parts of the assembly for easy adjustment by hand. A spring 47 compressed by the disc 46 against the disc 35 then provides a smoothly adjustable axial force squeezing the flanges 41 and 37 together and thus causing the washers 40 of vulcanized fibre to grip sprocket 39 with the desired turning force. Washers 38 are of wool felt saturated with oil.

By this arrangement it is found possible to produce a smooth operating clutch wherein wear between the friction surfaces, namely the vulcanized fibre washers 40 and the hardened surfaces of steel flanges 37 and 42 is minimal. Lubricant from the felt washers 38 passes completely through the fibre washers 40 to the friction surface, and once so lubricated it is found that the friction surfaces will not seize, gall or wear unduly even for periods long after the oil in washers 38 has been exhausted. In contrast to many other materials commonly used in clutch facings this material is also found to provide very uniform torque characteristics.

A spring washer 48 provides friction between knurled disc 46 and flange 42 to balance the force on the disc and provide effortless adjustment thereof.

Figure 3:
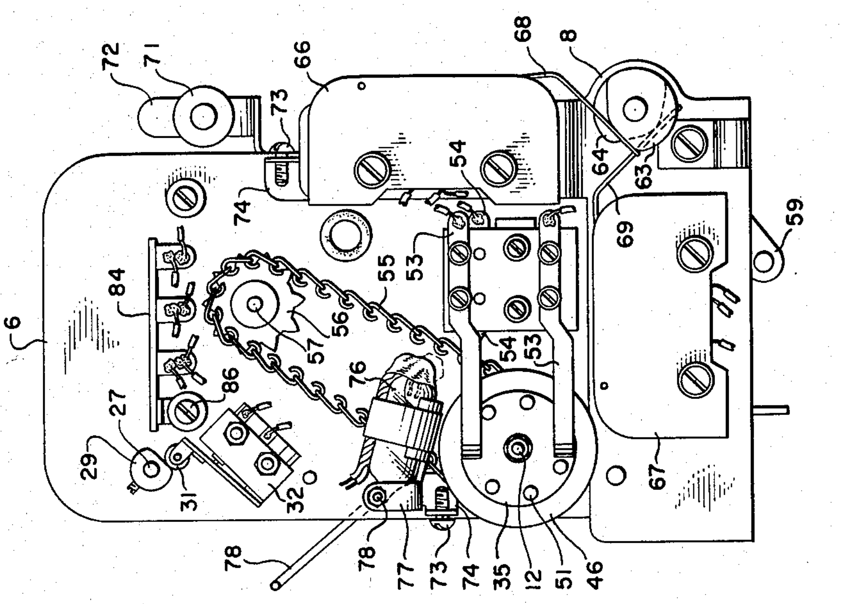
FIG. 3 is a rear view of FIG. 1.

An interrupter disc 35 of insulating material has a metallic back plate 49 to which are secured a plurality of metallic studs 51 protruding through the disc and arranged in a circle as seen also in FIG. 3; the assembly being fastened against a shoulder of shaft 12 by shaft nut 52. Wipers 53 contact the studs 51 while wiper 54 contacts the back plate 49 to provide a circuit which is regularly and rapidly interrupted during rotation of shaft 12, for convenient automatic detection by a tape tie-up alarm indicator not shown, which by the comparison of such signals with incoming telegraph signals, is arranged to signal an alarm in the event that signals arrive without corresponding motion of the tape. The ladder chain 55 connects sprocket 39 to sprocket 56 which is affixed to the shaft 57 of gear motor 58 (shown in FIG. 2) for rotation of the shaft 12 by said gear motor.

Returning to FIG. 1, there is seen at 59 a crank-like tape arm having a solid cylindrical portion resembling a handle 61, and affixed to a shaft 62 journalled in angular mounting plate 8.

As seen from the rear in FIG. 3, the shaft 62 has affixed to it cams 63 and 64 for the operation of snap acting switches 66 and 67 by means of their actuating arms 68 and 69 successively in that order by means of their respective cams upon lifting of the tape arm 59, which is normally positioned in the downward position shown because of the weight of the solid cylinder 61. Tape T, in feeding downward into a storage bin as previously described, and upwardly therefrom over the roller 71 which is affixed to plate 6 by the bracket 72, describes a loop around the cylinder 61. When following equipment such as a tape-transmitter has pulled all of the tape out of the storage bin, this loop tightens beneath cylinder 61 and lifts it, closing the switch 66 to cause feedout of enough blank tape from the preceding perforator to allow all punched characters to enter the following equipment. Further tightening of the tape opens switch 67 to stop the following equipment.

Screws 73 in brackets 74 bolted to plate 6 are used for retaining in place a dust cover not shown.

It is found when operating at transmitting speeds above about 100 words per minute, the highest in common commercial use, and up to 200 words per minute as required in some installations, that the small gear motor 58, conveniently used on the instant device, is subject to overheating during periods when the preceding tape devices are not delivering tape. In order to overcome this difficulty, advantage is taken of the fact that tension in the tape need not be as great while the machine is in the standby condition as when it is actually engaged in the process of crimping tape. For this reason it is permissible to insert additional electrical resistance in the circuit of the gear motor to reduce the current consumption and consequently the overheating effect of the current, when the incoming tape is tight.

This is accomplished in the instant invention by means of a mercury tilt switch 76 mounted in a cradle 77 which is affixed to a rod 78 rotatable in bearing holes formed in the backing plate 6 and the ear 79 of FIG. 1. Rod 78 is bent upwardly on the front of the machine and has a backwardly turned extremity visible in FIG. 2 whereby to intersect the path of incoming tape travel uopn swinging in the aforementioned bearing holes. Incoming tape is looped over rod 78 and the weight of switch 76 causes it to assume a vertical position when the tape is loose. When incoming tape is no longer being supplied, however, the tightening of the tape rotates rod 78, thus tilting switch 76 to open its contacts and introduce additional resistance into the circuit of gear motor 58, as above explained.

A terminal strip 84 is seen in FIG. 3 secured to plate 6 by means of a screw 86, and upon which electrical interconnections of the above described parts are made in accordance with the electrical wiring diagram later described. Wires connecting thereto are shown only at their terminations in order to avoid confusion of the drawing, and their proper path and identity may be discerned from the aforesaid wiring diagram.

Figure 5:
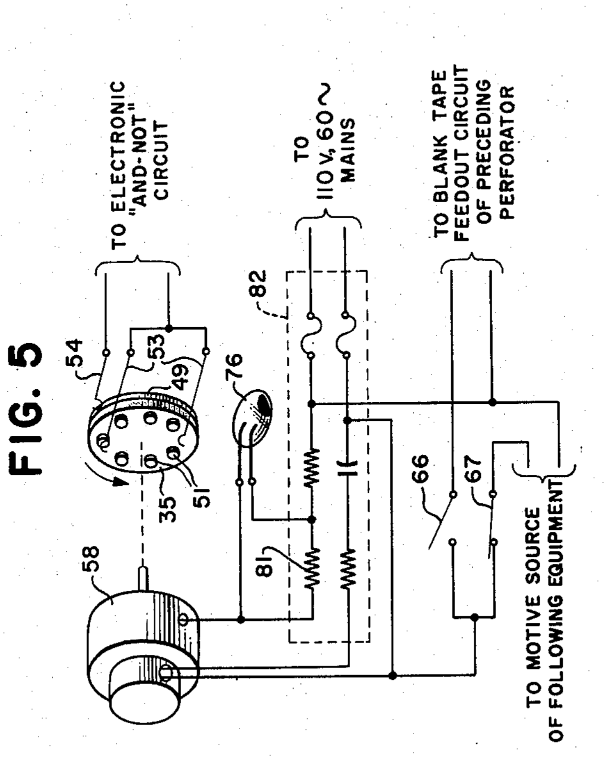
FIG. 5 is a wiring diagram of the machine.

In FIG. 5 there is shown an electrical wiring diagram of the instant invention wherein the method of control of gear motor 58 by the switch 76 is indicated in greater detail. The resistor 81, which may conveniently have a value of about 200 ohms is shown to be inserted in the circuit of the main phase motor winding when switch 76 is open. All of the equipment shown within the dotted area 82 comprising resistors, fuses and a condenser, are mounted exteriorly to the instant device as a matter of convenience, only the resistor 81 comprising a part of the instant invention. The circuitry associated with the interrupter disc 35 is of the type responding to a condition where incoming telegraph signals are present and interruption signals from the disc are not, commonly termed an "and not" circuit.

A substantial increase in the tape storage capacity of the storage bin is found to result from the use of the instant invention, since a greater amount of tape can be stored without danger of tangling.

Although this invention has been described in terms of a specific illustrative example thereof comprising a preferred embodiment of the invention, various modifications or elaborations thereof will be apparent to those skilled in the art and it is therefore intended that the invention be limited only by the appended claims.

What is claimed is:

1. A tape crimper for location in advance of transmitting equipment in the line of tape travel and following perforating equipment energizable to provide a succession of blanks comprising a pair of roller die means for imparting longitudinal creasing to paper telegraph tape moving into a downward storage loop, gear means on each of said pair of roller die means engaged for locking them in step, motor means to drive said roller die means, friction clutch means connected between said gear motor means and said roller die means, adjustable as to driving torque for applying a predetermined limited tension to said tape, switch means having an operating arm located out of the path of normal tape loop exit but within the loop for tape engagement upon tape loop tightening to energize perforating equipment to provide a succession of blanks and to deenergize transmitting equipment upon further tightening, an entering tape guide plate having an aperture covered by the tape, an electric switch mounted alongside the line of tape travel and having an operating switch arm positioned over said aperture and pressed against said tape for out-of-tape detection by switching action upon tape arm movement into the aperture, and current interrupter means comprising a commutator having spaced electrically interconnected segments and coupled for rotation with said roller die means, and brush means contacting said commutator for current modulation during die rotation whereby intergeared dies maintain a preset adhesive tape pull at reduced die pressure for tape breakage elimination so that loop switch operation indicates stoppage of preceding equipment in the presence of commutator modulation and an out-of-tape condition in its absence.

2. A tape crimper for use between an input unit and an output unit for telegraph punched tape comprising a pair of opposing and complementary spring-engaged tape crimping roller dies, located for discharging tape downwardly into a storage bin, a gear mounted on an end of each said die and normally in engagement for mutuality of die rotation, a friction clutch having manually adjustable friction means, attached to a said die, gear motor means for energizing said friction clutch to drive said roller dies, an out-of-tape detector comprising a perforated tape table for slidingly engaging tape in passage to said dies and a switch, hinged near the line of travel of said tape and having a tape contacting operating arm for operating said switch pressed against the tape above the perforation of said tape table, said switch being connected to said gear motor for stopping said motor upon penetration of said perforation by said tape arm in the absence of tape, said tape arm being located sufficiently in advance of said roller dies to enable them to stop before discharging the end of a broken tape, interrupter means coaxially attached to a said roller die comprising an insulating disc and contact buttons thereon and at least one brush arm contacting said contact buttons for producing a modulated electrical signal upon rotation of said roller die, a cam axled across the direction of tape travel, a crank arm on the axle and having a weighted portion located interiorly adjacent but out of contact with tape in its normal loop of travel out of said dies, and a pair of electric switches sequentially operable by the said cam upon lifting of the crank by a tape for tape output unit deenergization, followed by tape input unit deenergization whereby continuing motor operation during stopped tape conditions causes only output unit deactivation by one of the cam switches whereas tape breakage causes deactivation of both input and output units by the cam switches due to crimper motor shutdown by the out-of-tape detector and consequent cessation of modulated signal output.

3. A friction clutch for limiting driving torque to a feed wheel comprising a rotatable output shaft, a flanged collar affixed thereon, a sleeve slidable on said shaft exteriorly screw-threaded and having therein an axially extending cut-out portion, radial engagement means on said feed shaft for slidably engaging the cut-out portion, a flange on an end of said sleeve facing and spaced from the flange of said collar; manually rotatable disc means in threaded engagement with said sleeve, shoulder means on said shaft and a coiled compression spring bearing thereon, surrounding said shaft, and seating against said disc means to compress said flanges together, means operative against said sleeve flange to apply counterbalancing spring pressure against said disc, a driving wheel journaled on said shaft for rotation between said flanges, a pair of felt oiler washers each adjacent said disc and a pair of vulcanized fiber washers spacing said disc from said flanges.

4. In a crimper for telegraph tape, a pair of roller crimping dies having shrouded ends for tape guidance, motor means to revolve said dies, torque limiting friction clutch means connecting said motor means and said dies, a first switch mounted near the path of entering tape travel and having a switch operating lever resting on and supported by the entering tape when in the on position, said switch being connected in the circuit of said motor means for turning it off by movement of said switch arm upon failure of support due to absence of tape, a second switch mounted near the path of entering tape and having an operating arm located in a sag loop of the entering tape for opening by lifting of said operating arm by a tightening tape, and a current limiting resistor in series with said motor means and in shunt with said second switch whereby the tape motor speed is substantially reduced when the tape tension of a stalled tape lifts the tape arm to unshort the current limiting resistor by the second switch, and is reduced to zero in the absence of tape to support the switch arm of the first switch in its motor energizing position.

5. In a telegraph tape crimper, downwardly discharging roller die crimping means having a pair of resiliently engaged driven tape rollers, tape guiding roller shrouds thereon, motor driving means for said rollers, friction clutch means interconnecting said crimping means and said driving means comprising a symmetrical and coaxially spring loaded torque limiter wherein a coaxially threaded adjustment disc provides spring balanced manual limit adjustment during clutch operation, tape exit roller means to form a downwardly dependent tape loop, and switch means having a switch actuating arm located within the tape loop for switch actuation upon tape loop tightening to control following equipment whereby clutch tension is manually adjustable to provide a continuous adhesive tape pull sufficient to always feed available tape into the loop for causing switch energization of following equipment in the presence of tape loop.

6. In a telegraph tape crimper, downwardly discharging roller die crimping means having a pair of resiliently engaged driven tape rollers, tape guiding roller shrouds thereon, motor driving means for said rollers, friction clutch means interconnecting said crimping means and said driving means comprising a symmetrical and coaxially spring loaded torque limiter wherein a coaxially threaded adjustment disc provides spring balanced manual limit adjustment during clutch operation, tape exit roller means to form a downwardly dependent tape loop, first switch means and second switch means, switch actuating arm means located within the tape loop for first switch actuation upon initial tape loop tightening and second switch actuation upon further tape loop tightening, a resistor in circuit with said motor driving means, and third switch means connected in shunt with said resistor having an actuating arm located for slidable engagement of incoming tape for switch opening upon tape tightening to insert resistance in series with the driving motor under tight tape conditions whereby clutch slipping tension is manually adjustable to provide a predetermined maximum tape tension sufficient to provide motor protective resistor unshorting by the third switch means during the time between tightening tape loop actuation of the first and the second switches.

7. In a telegraph tape crimper, downwardly discharging roller die crimping means having a pair of resiliently engaged driven tape rollers, tape guiding roller shrouds thereon, motor driving means for said rollers, friction clutch means interconnecting said crimping means and said driving means comprising a symmetrical and coaxially spring loaded torque limiter wherein a coaxially threaded adjustment disc provides spring balanced manual torque limit adjustment during clutch operation to friction surfaces comprising oil-saturated vulcanized fibre, tape exit roller means to form a downwardly dependent tape loop, switch means having a switch actuating arm located within the tape loop for switch actuation upon tape loop tightening to control following equipment, a tape guide plate located to support entering tape and having a cut away portion beneath the tape, a switch connected in circuit with said motor driving means and having an operating arm slidably engaging and supported over said cut away portion by the tape for switch actuation to stop said motor under out-of-tape conditions by motion of said operating arm into said cut-away portion, and a tape tie-up detector comprising a plurality of revolving studs and electrical wipers therefor mounted for rotation with said roller die means and adapted to produce a series of rapid circuit interruptions during die rotation whereby tape breakage is prevented ahead of the dies by the clutch and after the dies by the switch means in the tape loop, so that only out-of-tape condition is signalled by cessation of circuit interruptions from the tie-up detector due to opening of the motor switch.

8. Telegraph tape transport and processing means comprising tape guide means having a cut-out portion therein, resiliently engaged tape feeding roller die means located for drawing tape through said guide means and imparting at least a single longitudinal crease to a paper tape drawn therethrough, tape guiding flanges on one of the said roller die means, interlocking involute gear teeth on each of said roller die means for synchronized die rotation, gear motor driving means, a torque limiting friction clutch comprising a pair of opposed and shaft connected collars adapted for longitudinal sliding to adjustably squeeze with slippery surfaces the smooth sides of an input wheel located therebetween and a spring balanced adjustment disc threaded on one of said collars for manual adjustment of collar thrust against a shaft shoulder, said friction clutch connecting said gear motor and said roller die means, and a switch in circuit with said gear motor and having an operating arm located for sliding tape contact over said guide means cutout portion, and adapted to stop said gear motor upon falling of the operating arm into the cut-out portion due to absence of supporting tape whereby enveloping tape tractive effort by both of the actively rotated dies reduces the die pressure required on the tape for tape transport to a value sufficiently low that the friction clutch may be adjusted to slip before the dies slip to prevent wearing through of the tape in the presence of a stopped tape as detected by the switch.

References Cited by the Examiner

UNITED STATES PATENTS

| | | | |
|---|---|---|---|
| 169,378 | 11/75 | Shive | 346—136 |
| 1,595,472 | 8/26 | Krum | 178—27 |
| 1,800,195 | 4/31 | Porter et al. | 178—42 |
| 1,905,481 | 4/33 | Lynn | 178—42 |
| 1,985,640 | 12/34 | Kitchens | 178—17 |
| 2,045,536 | 6/36 | Eitzen | 178—42 |
| 2,142,880 | 1/39 | Anderson et al. | 178—42 |
| 2,227,355 | 12/40 | Lawson | 203—12 |
| 2,229,480 | 1/41 | Spencer et al. | 178—42 |
| 2,293,704 | 8/42 | Blanton | 178—17 |
| 2,317,921 | 4/43 | Leach | 203—12 |
| 2,353,608 | 7/44 | Zenner | 178—42 |
| 2,384,194 | 9/45 | Potts | 178—17 |
| 2,403,441 | 7/46 | Kinkead | 178—42 |
| 2,464,601 | 3/49 | Nichols | 178—17 |
| 2,597,136 | 5/52 | Snyder | 318—6 |
| 2,707,362 | 5/55 | Thelander | 64—30 |
| 2,726,524 | 12/55 | Gorin | 64—30 |
| 2,818,468 | 12/57 | Haupt et al. | 178—17.5 |
| 2,872,794 | 2/59 | Slomer | 64—30 |
| 2,911,634 | 11/59 | Ferguson | 340—259 |
| 2,923,769 | 2/60 | Kleinschmidt | 178—17 |

OTHER REFERENCES

Perforated Tape Creasing Devices, by F. J. Haupt, Western Union Technical Review, April 1953, pp. 51–55.

ROBERT H. ROSE, *Primary Examiner.*

NEWTON LOVEWELL, *Examiner.*